(12) United States Patent
Pockrandt

(10) Patent No.: US 7,103,494 B2
(45) Date of Patent: Sep. 5, 2006

(54) CIRCUIT ARRANGEMENT AND DATA PROCESSING METHOD

(75) Inventor: Wolfgang Pockrandt, Reichertshausen (DE)

(73) Assignee: Infineon Technologies AG, (DE)

( * ) Notice: Subject to any disclaimer, the term of this patent is extended or adjusted under 35 U.S.C. 154(b) by 0 days.

(21) Appl. No.: 10/866,070

(22) Filed: Jun. 10, 2004

(65) Prior Publication Data

US 2004/0264273 A1    Dec. 30, 2004

Related U.S. Application Data

(63) Continuation of application No. PCT/DE02/04443, filed on Dec. 4, 2002.

(30) Foreign Application Priority Data

Dec. 12, 2001   (DE) ................................. 101 61 046

(51) Int. Cl.
G06F 1/24 (2006.01)

(52) U.S. Cl. ...................... 702/117; 702/118; 702/182; 702/183

(58) Field of Classification Search ................ 702/57, 702/106, 117, 122, 183, 189, 182, 118; 365/286; 380/28; 706/33; 708/420; 327/20, 34, 43, 327/78
See application file for complete search history.

(56) References Cited

U.S. PATENT DOCUMENTS

| | | | |
|---|---|---|---|
| 5,307,299 A * | 4/1994 | Stein et al. ................. | 708/420 |
| 5,798,756 A * | 8/1998 | Yoshida et al. ............. | 345/179 |
| 6,246,970 B1 | 6/2001 | Silverbrook ................ | 702/117 |
| 6,867,623 B1 * | 3/2005 | Nishizono .................... | 327/78 |
| 6,927,580 B1 * | 8/2005 | Wuidart et al. ............. | 324/617 |
| 2002/0130248 A1 * | 9/2002 | Bretschneider et al. . | 250/214 R |
| 2004/0205095 A1 * | 10/2004 | Gressel et al. .............. | 708/253 |

FOREIGN PATENT DOCUMENTS

| | | |
|---|---|---|
| DE | 196 26 184 C2 | 1/1998 |
| EP | 0 874 369 A2 | 10/1998 |
| EP | 1 154 375 A1 | 11/2001 |

OTHER PUBLICATIONS

Khoo et al., Single-Transistor Transparent-Latch Clocking, 1995, IEEE Integrated Circuits and Systems Laboratory, University of California, Los Angeles, pp. 331-341.*

* cited by examiner

Primary Examiner—Marc S. Hoff
Assistant Examiner—Felix Suarez
(74) Attorney, Agent, or Firm—Dickstein Shapiro LLP

(57) ABSTRACT

A circuit arrangement in which two parallel subcircuits having a same functionality have a same input signal applied to them, and their output signals are compared in a common comparison arrangement. The two subcircuits are designed differently in terms of sensitivity to changes in environmental or operating parameters. Impermissible environmental parameters are indicated if the output signals differ from one another, and an alarm is generated.

15 Claims, 1 Drawing Sheet

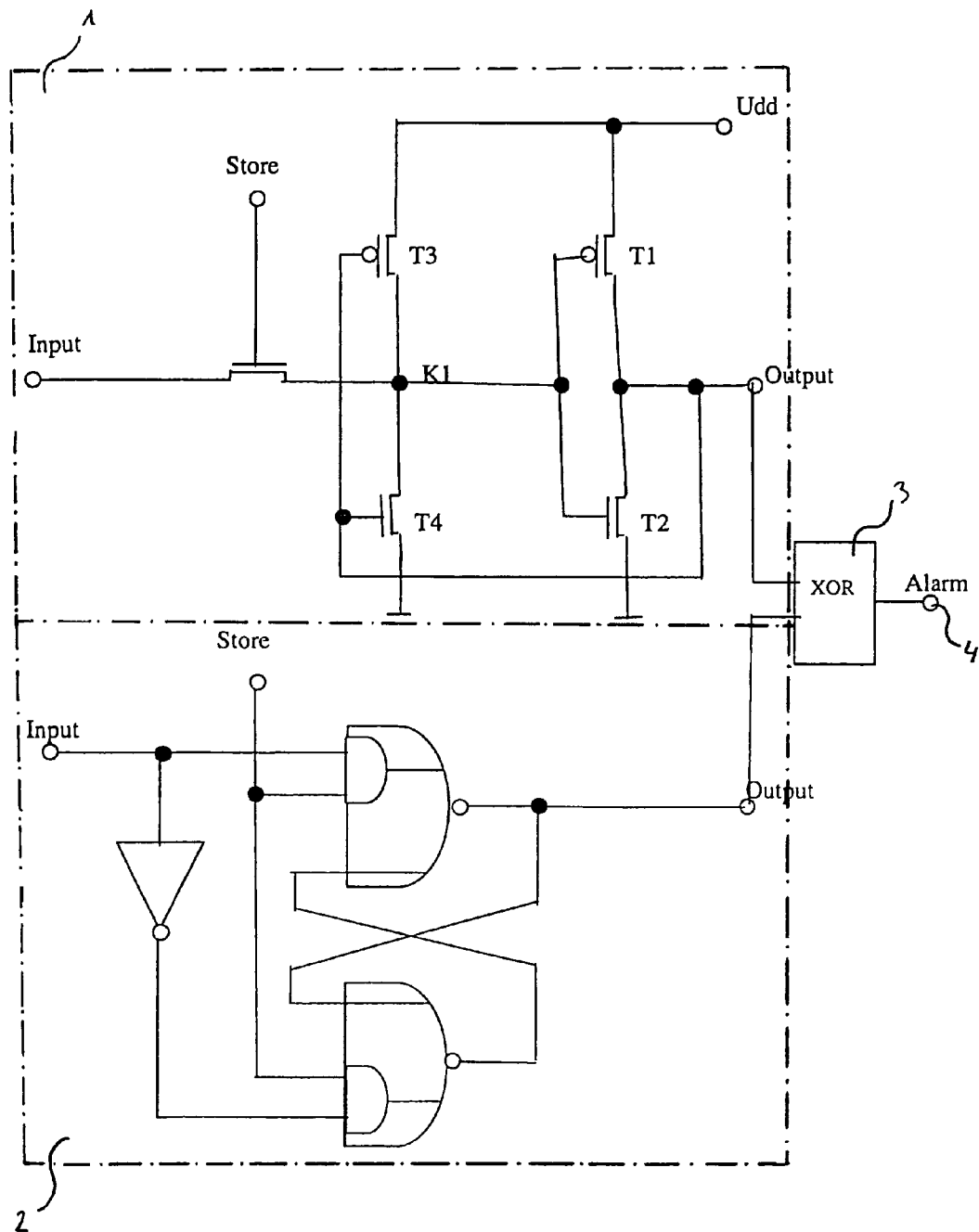
Fig.

# CIRCUIT ARRANGEMENT AND DATA PROCESSING METHOD

CROSS-REFERENCE TO RELATED APPLICATION

This application is a continuation of International Patent Application Serial No. PCT/DE02/04443, filed Dec. 4, 2002, which published in German on Jul. 3, 2003 as WO 03/054789, and is incorporated herein by reference in its entirety.

FIELD OF THE INVENTION

The invention relates to a circuit arrangement and to a data processing method which can be operated therewith in which two parallel subcircuits having the same functionality have the same input signal applied to them, and their output signals are compared in a common comparison arrangement.

BACKGROUND OF THE INVENTION

Ideally, electronic circuits are insensitive to interfering influences such as fluctuations in the supply voltage [lacuna] in the clock frequency or environmental influences such as light and temperature. Unfortunately, this is not the case in practice. Thus, every electronic circuit operates without error only in a particular tolerance range for said parameters. One problem found in this context is the definition of the tolerance limits for the aforementioned parameters. Should the combined effective tolerances of various parameters need to be taken into account, it becomes even more difficult.

Making circuits entirely insensitive to interfering influences is associated with an extremely high level of cost or is technically infeasible or is not at all possible physically. This property of electronic circuits is utilized maliciously by hackers who wish to influence the output signals from the circuit consciously and who deliberately bring about faults. Particularly in the case of smart cards and comparable applications, this is the reason why the need to protect the information and circuits on these media against unauthorized access is very high. To bring about a state for smart cards which ensures the greatest possible security, simply placing a tight restriction on the operating conditions is not a satisfactory solution.

This has been the solution to date, however. The environmental influences such as supply voltage, frequency, light and temperature are monitored using sensors. If one of the parameters slips into a range which is not tolerated, the chip is disconnected. One difficulty found in this context is defining the tolerated range. Firstly it should be as large as possible and secondly error-free, reliable operation should be ensured within the tolerated range.

In addition, the sensors for, by way of example, light, temperature, voltage and clock frequency cannot detect the environmental conditions directly on or in the circuit, since they are normally implemented so as to be physically isolated from the circuit which is to be monitored. This means that the measured result delivered by the sensors does not reflect the environmental and operating conditions which are effective directly in the circuit. The environmental and operating conditions in the circuits can differ very greatly from those on the sensors.

SUMMARY OF THE INVENTION

Against the background of this area of problems described in the introduction, the invention is based on an object of reliably identifying and signaling interfering influences as closely as possible to the affected circuit.

The invention achieves this object by means of the measure specified in the patent claims. It describes a circuit arrangement in which two subcircuits are operated in parallel. In this context, the two subcircuits have the same functionality, with one of the subcircuits being designed to be stable with respect to external influences and the other subcircuit being designed to be consciously more sensitive to external influences. The output signal from the two subcircuits is applied to the inputs of a common comparison circuit and is compared. If different signals are applied to the inputs of the comparison circuit, the comparison circuit produces a defined value which can be interpreted as an alarm or can be used to disconnect the circuit arrangement.

An advantage of the inventive circuit arrangement or of the inventive data processing method in this case is that interfering parameters are identified not by ascertaining the physical magnitudes of the parameters, but rather by the effect thereof. Another advantage is that this means that the effect of the parameters delivers the result, and not sensors placed at the edge of the electronic circuit. The environmental influences on the circuit can thus also be monitored less expensively and more reliably than was previously the case.

In an extended embodiment, the circuits are in a form such that they are able to process digital signals. A further refinement of the invention implements the subcircuits in a common circuit.

If the size of the components making up the circuit is chosen to be small enough, it is possible to accommodate the circuit arrangement on a smart card or on a microchip incorporated in a smart card. Microchips and sensors on smart cards are integrated circuits for processing digital signals, another advantageous refinement of the invention. What task the circuit performs is of subordinate significance to the invention. It is thus possible for the individual subcircuits to have the functionality of electronic memory cells.

Electronic memory cells process digital signals. They store either a signal 1 for "high" or a signal 0 for "low". In this context, memory cells can be optimized only for one of the two switching directions in each case.

Particularly for larger circuits, this requires at least two corresponding circuits to be optimized in the direction from "high" to "low", and two further corresponding circuits to be optimized in the direction from "low" to "high". If the at least four inputs on these circuits then have the same input signal supplied to them and the result from two respective corresponding circuits is compared in a comparison element, a circuit arrangement is obtained in which both switching directions, that is say from "high" to "low" and from "low" to "high", are optimally monitored.

If even the input signal is now intended to be unforeseeable for a potential hacker, then suitable means, such as a random number generator, can be used to alter the input signal specifically. The result of this is that not only interfering parameters on the circuit itself but also manipulation of the input signal by an hacker can be prevented.

BRIEF DESCRIPTION OF THE DRAWING

The invention is explained in more detail below using an example illustrated in the drawing.

DETAILED DESCRIPTION OF THE PREFERRED MODE OF THE INVENTION

The drawing shows a latch (1) and a storage element (2). The storage element (2) is constructed from a failsafe flip flop (2). The latch (1) comprises the transistors T1, T2, T3 and T4. T1 and T2 are field effect transistors of normal design. The transistors T3 and T4 are designed to have a very high impedance. This allows this latch to be "overridden" when storing the information. This means that T3 and T4 switch distinctly after T1 and T2. This high-impedance design of the transistors T3 and T4 means that the node K1 is also susceptible to interference, since it cannot follow possible alterations quickly enough or can be discharged as a result of environmental influences, for example, such as light or temperature. Acting in parallel with the latch (1) is a failsafe flip flop (2). The inputs on both circuits have the same signal applied to them. The outputs from the latch (1) and from the failsafe flip flop (2) are compared in a comparative circuit, an XOR gate (3). If the output signals from the two subcircuits (1) and (2) differ from one another, the output of the XOR gate produces "high". This information indicates a fault in the circuit as a result of impermissible alteration of the operating or environmental parameters and can subsequently be used for an alarm or other measures.

The invention claimed is:

1. A circuit arrangement comprising:
   at least one first subcircuit and a second subcircuit having a same functionality, inputs connected to one another, and at least one output of each of the subcircuits connected to a common comparison circuit,
   wherein the first and second subcircuits have different sensitivities to external influences.

2. The circuit arrangement as claimed in claim 1, wherein the circuit arrangement processes digital signals.

3. The circuit arrangement as claimed in claim 1, wherein the subcircuits are provided in a common circuit.

4. The circuit arrangement as claimed in claim 1, wherein the circuit arrangement is incorporated in a smart card.

5. The circuit arrangement as claimed in claim 4, wherein the circuit arrangement is incorporated in a sensor of a smart card.

6. The circuit arrangement as claimed in claim 1, wherein the subcircuits function as a memory cell.

7. The circuit arrangement as claimed in claim 2, wherein at least two corresponding circuit arrangements are optimized for a digital state change from "low"to "high" and two further corresponding circuit arrangements are optimized for a digital state change from "high"to "low".

8. The circuit arrangement as claimed in claim 1, wherein a sequence of input signals cannot be foreseen.

9. The circuit arrangement as claimed in claim 1, wherein the first subcircuit is a latch and the second subcircuit is a storage element.

10. The circuit arrangement as claimed in claim 9, wherein the second subcircuit comprises a failsafe flip flop.

11. The circuit arrangement as claimed in claim 9, wherein the latch comprises four transistors, two of which are field effect transistors of normal design and the other two of which have high impedance.

12. The circuit arrangement as claimed in claim 1, wherein the common comparison circuit comprises an XOR gate.

13. The circuit arrangement as claimed in claim 12, wherein if output signals from the first and second subcircuits differ from one another, the output of the XOR gate produces a high signal.

14. The circuit arrangement as claimed in claim 12, further comprising an alarm connected to the common comparison circuit, wherein if output signals from the first and second subcircuits differ from one another, the alarm is activated.

15. A data processing method comprising the steps of:
    routing data in at least two parallel processing streams having a same functionality;
    performing processing in each of the two processing streams on a basis of enviromental influences;
    comparing data output from each of the two processing streams; and
    producing an alarm signal if the compared data do not match.

* * * * *